(12) United States Patent
Tsuchiya et al.

(10) Patent No.: US 10,891,498 B2
(45) Date of Patent: Jan. 12, 2021

(54) VEHICLE CONTROL SYSTEM, VEHICLE CONTROL METHOD, AND READABLE STORAGE MEDIUM

(71) Applicant: HONDA MOTOR CO., LTD., Tokyo (JP)

(72) Inventors: Masamitsu Tsuchiya, Wako (JP); Hideki Matsunaga, Wako (JP); Yasuharu Hashimoto, Wako (JP); Etsuo Watanabe, Wako (JP); Yuki Oshitani, Tokyo (JP); Ryoma Taguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 62 days.

(21) Appl. No.: 16/262,972

(22) Filed: Jan. 31, 2019

(65) Prior Publication Data
US 2019/0244038 A1    Aug. 8, 2019

(30) Foreign Application Priority Data

Feb. 8, 2018    (JP) ................. 2018-021336

(51) Int. Cl.
*G06K 9/00*    (2006.01)
*G08G 1/16*    (2006.01)
*G06K 9/32*    (2006.01)

(52) U.S. Cl.
CPC ....... *G06K 9/00805* (2013.01); *G06K 9/3241* (2013.01); *G08G 1/165* (2013.01); *G08G 1/166* (2013.01); *G06K 9/00369* (2013.01); *G06T 2207/30252* (2013.01)

(58) Field of Classification Search
CPC ............. G06K 9/00805; G06K 9/3241; G06K 9/00369; G06K 9/00825; G08G 1/165; G08G 1/166; G08G 1/162; G06T 2207/30252; B60W 30/09; B60W 40/04; B60W 2754/50; B60W 2520/10; B60W 30/146; B60W 30/0956; B60W 2554/801; G05D 1/0212; G05D 2201/0213; G05D 1/0088; B62D 15/025
See application file for complete search history.

(56) References Cited

U.S. PATENT DOCUMENTS

| | | | | |
|---|---|---|---|---|
| 2016/0124432 A1* | 5/2016 | Kawagoe | ............... | G08G 1/162 701/24 |
| 2016/0224027 A1* | 8/2016 | Yamamoto | ............ | B60W 30/09 |
| 2018/0370526 A1* | 12/2018 | Ohmura | ............... | B60W 30/146 |

FOREIGN PATENT DOCUMENTS

| | | |
|---|---|---|
| JP | 5865981 | 2/2016 |
| JP | 2016-143137 | 8/2016 |

\* cited by examiner

*Primary Examiner* — Jianxun Yang
(74) *Attorney, Agent, or Firm* — Amin, Turocy & Watson, LLP

(57) ABSTRACT

A vehicle control system including a recognizer that is configured to recognize a surroundings status of a vehicle and a driving controller that is configured to control at least steering of the vehicle on the basis of the surroundings status recognized by the recognizer, and, in a case in which a obstacle present in an advancement direction of the vehicle and traffic participants present near the obstacle are recognized by the recognizer, and the vehicle is caused to avoid the obstacle, the driving controller is configured to control the vehicle on the basis of advancement directions of the traffic participants.

17 Claims, 15 Drawing Sheets

VEHICLE CONTROL SYSTEM, VEHICLE CONTROL METHOD, AND READABLE STORAGE MEDIUM

CROSS-REFERENCE TO RELATED APPLICATION

Priority is claimed on Japanese Patent Application No. 2018-021336, filed Feb. 8, 2018, the content of which is incorporated herein by reference.

BACKGROUND

Field of the Invention

The present invention relates to a vehicle control system, a vehicle control method, and a readable storage medium.

Description of Related Art

In recent years, automatic control of vehicles has been researched (for example, Japanese Unexamined Patent Application, First Publication No. 2016-143137 and Japanese Patent No. 5865981).

However, in conventional technology, control performed when an obstacle and a traffic participant are simultaneously present is not sufficiently taken into account. For this reason, there are cases in which a vehicle cannot be appropriately controlled in accordance with traffic conditions.

An aspect of the present invention is in consideration of such situations, and one object thereof is to provide a vehicle control system, a vehicle control method, and a readable storage medium capable of appropriately controlling a vehicle in accordance with traffic conditions.

SUMMARY

A vehicle control system, a vehicle control method, and a readable storage medium according to the present invention employ the following configurations.

(1): A vehicle control system according to one aspect of the present invention is a vehicle control system including: a recognizer that is configured to recognize a surroundings status of a vehicle; and a driving controller that is configured to control at least steering of the vehicle on the basis of the surroundings status recognized by the recognizer, wherein, in a case in which a target obstacle present in an advancement direction of the vehicle and one or more traffic participants present near the target obstacle are recognized by the recognizer, and the vehicle is caused to avoid the target obstacle, the driving controller is configured to control the vehicle on the basis of advancement directions of the one or more traffic participants.

(2): In the aspect (1) described above, in a case in which the advancement directions of all the traffic participants among the one or more traffic participants present near the target obstacle coincide with a reference direction according to an advancement direction of the vehicle, the driving controller is configured to perform control of the vehicle to avoid the target obstacle.

(3): In the aspect (2) described above, the driving controller is configured to cause the one or more traffic participants to follow the vehicle when the vehicle is caused to avoid the target obstacle.

(4): In the aspect (1) or (2) described above, in a case in which an advancement direction of one or more traffic participants among the one or more traffic participants present near the target obstacle recognized by the recognizer does not coincide with a reference direction according to an advancement direction of the vehicle, the driving controller is configured to perform control of the vehicle such that it stops in front of the target obstacle.

(5): In any one of the aspects (2) to (4) described above, the reference direction is a direction having a relationship of being at an acute angle to the advancement direction of the vehicle out of extending directions of a road.

(6): In any one of the aspects (1) to (4) described above, the one or more traffic participants present near the target obstacle are pedestrians.

(7): In any one of the aspects (1) to (6) described above, the one or more traffic participants present near the target obstacle are one or more traffic participants present within a first predetermined distance from the target obstacle.

(8): In any one of the aspects (1) to (7) described above, in a case in which a distance between the vehicle and the target obstacle is within a second predetermined distance, the one or more traffic participants present near the target obstacle are one or more traffic participants present within a first predetermined distance, which is shorter than the second predetermined distance, from the target obstacle.

(9): In any one of the aspects (1) to (8) described above, in a case in which a required time until the vehicle running along a first target locus deviating to one side of the road runs along a second target locus disposed on a side of the center of the road from the first target locus for avoiding the target obstacle and returns from the second target locus to the first target locus after the vehicle avoids the target obstacle is assumed, the one or more traffic participants present near the target obstacle object are one or more traffic participants present within a predetermined range having the target obstacle as its center during the required time.

(10): In any one of the aspects (1) to (9) described above, the target obstacle is an object having an influence on a target locus of the vehicle in a case in which the vehicle runs.

(11): In any one of the aspects (1) to (10) described above, in a case in which a distance to the target obstacle becomes within a third predetermined distance, the driving controller is configured to start a process of controlling the vehicle on the basis of the advancement directions of the one or more traffic participants.

(12): In any one of the aspects (1) to (11) described above, the driving controller controls the vehicle on the basis of the advancement directions of the one or more traffic participants in the case of passing through a road of which a road width is less than a predetermined width.

(13) One aspect of a vehicle control method according to the present invention is a vehicle control method using a computer, the vehicle control method including: recognizing a surroundings status of a vehicle; controlling at least steering of the vehicle on the basis of the recognized surroundings status; and controlling the vehicle on the basis of advancement directions of one or more traffic participants in a case in which a target obstacle present in an advancement direction of the vehicle and the one or more traffic participants present near the target obstacle are recognized through the recognition of the surroundings status, and the vehicle is caused to avoid the target obstacle.

(14) One aspect of a readable storage medium according to the present invention is a non-transitory computer-readable storage medium that stores a computer program to be executed by a computer to perform at least: recognize a surroundings status of a vehicle; control at least steering of the vehicle on the basis of the recognized surroundings status; and control the vehicle on the basis of advancement directions of one or more traffic participants in a case in which a target obstacle present in an advancement direction of the vehicle and the one or more traffic participants present near the target obstacle are recognized through the recognition of the surroundings status, and the vehicle is caused to avoid the target obstacle.

According to the aspects (1), (6), (10), (12) to (14) described above, a vehicle can be appropriately controlled in accordance with traffic conditions.

According to the aspects (2) to (5) described above, even in a case in which an oncoming vehicle, an obstacle, and a traffic participant are present, the obstacle can be smoothly passed by without interrupting other traffic.

According to the aspects (7) to (9) described above, furthermore, traffic participants having an influence on running of a vehicle can be appropriately selected as traffic participants that are processing targets. As a result, useless processing is inhibited, and a processing load can be reduced.

According to the aspect (11) described above, furthermore, even in a case in which an obstacle is recognized, when there is a predetermined time until a transition to an operation of avoiding the obstacle, the processing is not started, and accordingly, useless processing is inhibited, and the processing load can be reduced.

DETAILED DESCRIPTION

Hereinafter, a vehicle control device, a vehicle control method, and a readable storage medium according to embodiments of the present invention will be described with reference to the drawings. Hereinafter, although a case in which a rule of left traffic is applied will be described, the left side and the right side may be interchanged in a case in which a rule of right traffic is applied.

[Entire Configuration]

Figure 1:
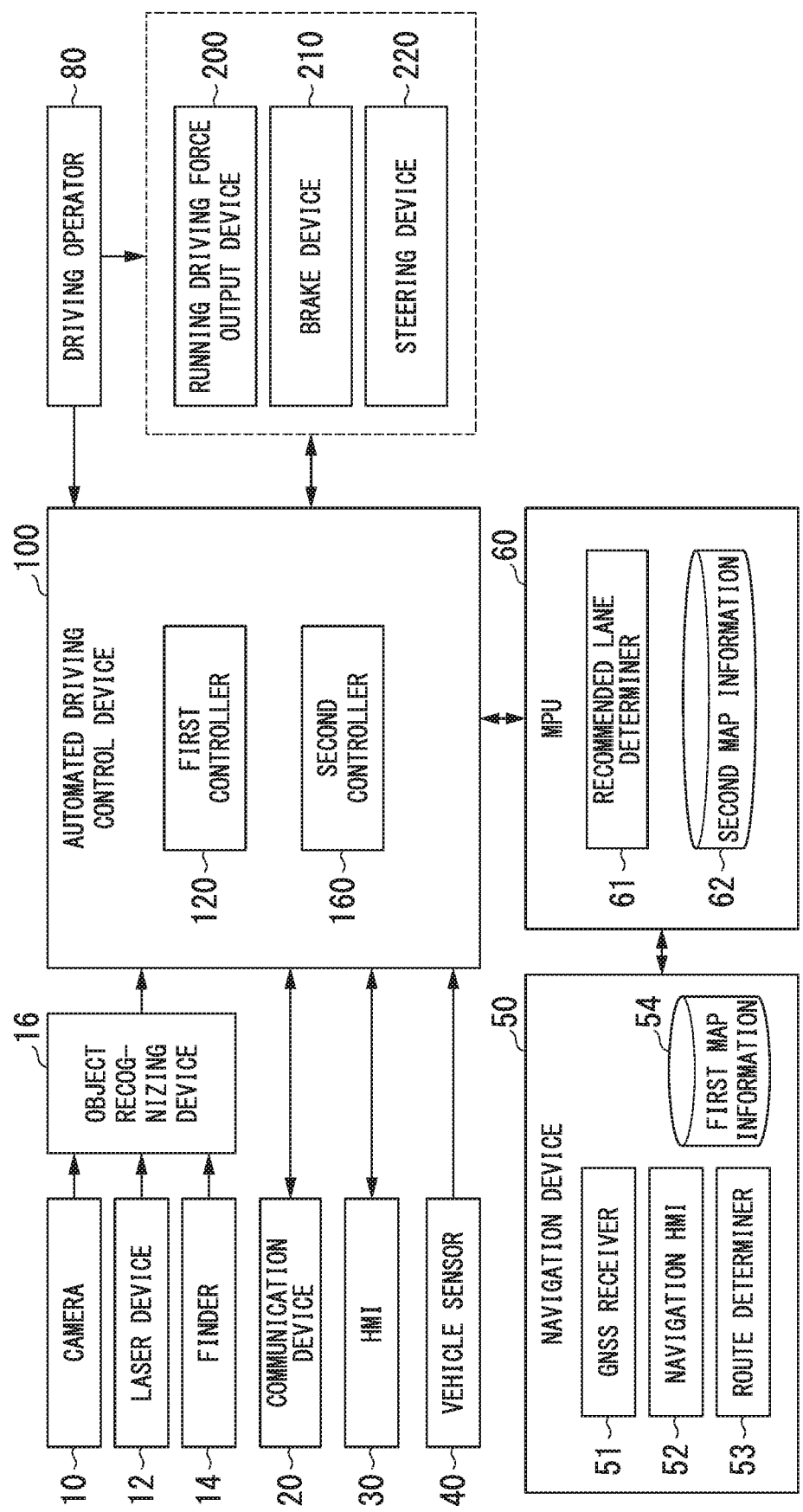
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. The electric motor operates using power generated using a power generator connected to an internal combustion engine or discharge power of a secondary cell or a fuel cell.

The vehicle system 1, for example, includes a camera 10, a radar device 12, a finder 14, an object recognizing device 16, a communication device 20, a human machine interface (HMI) 30, a vehicle sensor 40, a navigation device 50, a map positioning unit (MPU) 60, a driving operator 80, an automated driving control device 100, a running driving force output device 200, a brake device 210, and a steering device 220. Such devices and units are interconnected using a multiplex communication line such as a controller area network (CAN) communication line, a serial communication line, a radio communication network, or the like. The configuration shown in FIG. 1 is merely one example, and thus, a part of the configuration may be omitted, and, furthermore, other components may be added thereto.

The camera 10, for example, is a digital camera using a solid-state imaging device such as a charge coupled device (CCD) or a complementary metal oxide semiconductor (CMOS). The camera 10 is installed at arbitrary places on a vehicle (hereinafter, referred to as a subject vehicle M) in which the vehicle system 1 is mounted. In a case in which the side in front is to be imaged, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar device 12 emits radiowaves such as millimeter waves to the vicinity of the subject vehicle M and detects at least a position of (a distance and an azimuth to) an object by detecting radiowaves (reflected waves) reflected by the object. The radar device 12 is installed at arbitrary places on the subject vehicle M. The radar device 12 may detect a position and a speed of an object using a frequency modulated continuous wave (FM-CW) system.

The finder 14 is a light detection and ranging (LIDAR). The finder 14 emits light to the vicinity of the subject vehicle M and measures scattering light generated in accordance with the emitted light. The finder 14 detects a distance to a target on the basis of a time from light emission to light reception. The emitted light, for example, is a pulse-form laser light. The finder 14 is mounted at an arbitrary position on the subject vehicle M.

The object recognizing device 16 may perform a sensor fusion process on results of detection using some or all of the camera 10, the radar device 12, and the finder 14, thereby allowing recognition of a position, a type, a speed, and the like of an object. The object recognizing device 16 outputs a result of recognition to the automated driving control device 100. The object recognizing device 16 may output results of detection using the camera 10, the radar device 12, and the finder 14 to the automated driving control device 100 as they are. The object recognizing device 16 may be omitted from the vehicle system 1.

The communication device 20, for example, communicates with other vehicles in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to an occupant of the subject vehicle M and receives an input operation performed by a vehicle occupant. The HMI 30 may include various display devices, a speaker, a buzzer, a touch panel, switches, keys, and the like.

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the azimuth of the subject vehicle M, and the like.

The navigation device 50, for example, includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of a subject vehicle M on the basis of signals received from GNSS satellites. The position of the subject vehicle M may be identified or supplemented by an inertial navigation system (INS) using an output of the vehicle sensor 40.

The navigation HMI 52 includes a display device, a speaker, a touch panel, a key, and the like. A part or all of the navigation HMI 52 and the HMI 30 described above may be configured to be shared. The route determiner 53, for example, determines a route from a position of the subject vehicle M identified by the GNSS receiver 51 (or an input arbitrary position) to a destination input by a vehicle occupant using the navigation HMI 52 (hereinafter referred to as a route on a map) by referring to the first map information 54. The first map information 54, for example, is information in which a road form is represented by respective links representing a road and respective nodes connected using the links. The first map information 54 may include a curvature of each road, point of interest (POI) information, and the like. The route on the map is output to the MPU 60. The navigation device 50 may perform route guidance using the navigation HMI 52 on the basis of the route on the map. Furthermore, the navigation device 50, for example, may be implemented by a function of a terminal device such as a smartphone or a tablet terminal held by a vehicle occupant. The navigation device 50 may transmit a current location and a destination to a navigation server through the communication device 20 and acquire a route that is equivalent to the route on the map from the navigation server.

The MPU 60, for example, includes a recommended lane determiner 61 and stores second map information 62 in a storage device such as an HDD or a flash memory. The recommended lane determiner 61 divides a route on the map provided from the navigation device 50 into a plurality of blocks (for example, divides the route for every 100 [m] in the advancement direction of the vehicle) and determines a recommended lane for each block by referring to the second map information 62. The recommended lane determiner 61 determines on which of lanes numbered from the left side to run. In a case in which a branching place is present in the route on the map, the recommended lane determiner 61 determines a recommended lane such that the subject vehicle M can run on a reasonable route for advancement to a branching destination.

The second map information 62 is map information having an accuracy higher than that of the first map information 54. The second map information 62, for example, includes information of the center of respective lanes, information on boundaries between lanes, or the like. In addition, in the second map information 62, road information, traffic regulations information, address information (address and zip code), facilities information, telephone number information, and the like may be included. As the communication device 20 communicates with another device, the second map information 62 may be updated as needed.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of the detection is output to the automated driving control device 100 or some or all of the running driving force output device 200, the brake device 210, and the steering device 220.

The automated driving control device 100, for example, includes a first controller 120, and a second controller 160. Each of the first controller 120 and second controller 160, for example, is implemented by a hardware processor such as a central processing unit (CPU) executing a program (software). In addition, some or all of such constituent elements may be implemented by hardware (a circuit; including circuitry) such as a large scale integration (LSI), an application specific integrated circuit (ASIC), a field-programmable gate array (FPGA), or a graphics processing unit (GPU) or may be implemented by cooperation between software and hardware. The program may be stored in a storage device such as an HDD or a flash memory of the automated driving control device 100 in advance or may be stored in a storage medium (non-transitory storage medium) such as a DVD or a CD-ROM that can be loaded or unloaded and installed in the HDD or the flash memory of the automated driving control device 100 by loading the storage medium into a drive device.

Figure 2:
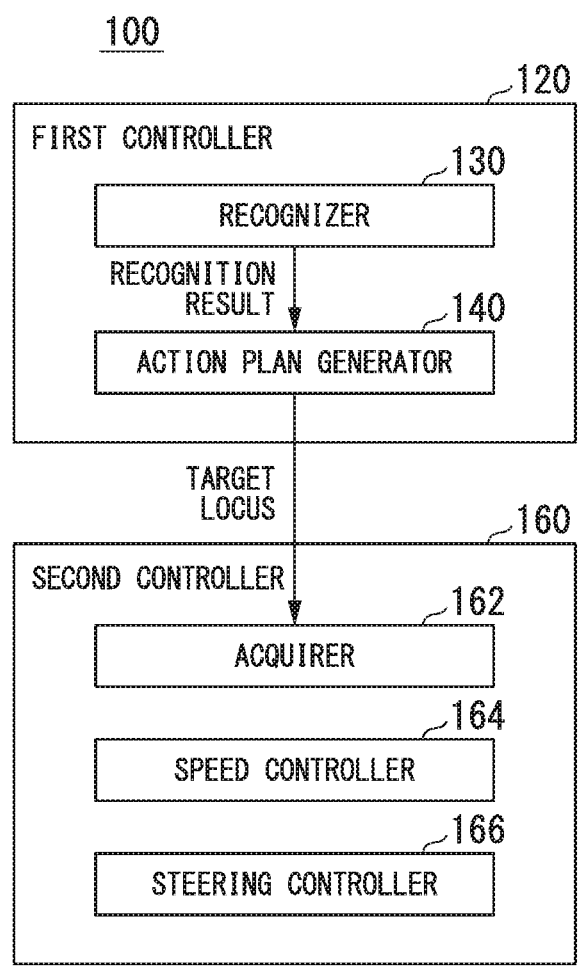
FIG. 2 is a functional configuration diagram of a first controller and a second controller.

FIG. 2 is a functional configuration diagram of the first controller 120 and the second controller 160. The first controller 120, for example, includes a recognizer 130 and an action plan generator 140. A combination of the action plan generator 140 and the second controller 160 is one example of a "driving controller." The first controller 120, for example, simultaneously implements functions using artificial intelligence (AI) and functions using a model provided in advance. For example, a function of "recognizing an intersection" may be implemented by executing recognition of an intersection using deep learning or the like and recognition based on conditions given in advance (a signal, road markings, and the like that can be used for pattern matching are present) at the same time, assigning scores to processing results of both recognition processes, and comprehensively evaluating the processing results to which the scores have been assigned. Accordingly, the reliability of automated driving is secured.

The recognizer 130 recognizes states such as a position, a speed, an acceleration, and the like of each object present in the vicinity of the subject vehicle M on the basis of information input from the camera 10, the radar device 12, and the finder 14 through the object recognizing device 16. The position of an object, for example, is recognized as a position on an absolute coordinate system having a representative point (the center of gravity, the center of a driving shaft, or the like) of the subject vehicle M as its origin and is used for control. The position of an object may be represented as a representative point such as the center of gravity or a corner of an object or may be represented as a representative area. A "state" of an object may include an acceleration, a jerk, or an "action state" (for example, whether or not the object is changing lanes or will change lanes) of an object.

The recognizer 130, for example, recognizes a lane (running lane) in which the subject vehicle M is running. For example, the recognizer 130 may recognize a running lane by comparing a pattern of road partition lines acquired from the second map information 62 (for example, an array of solid lines and broken lines) with a pattern of road partition lines in the vicinity of the subject vehicle M that has been recognized from an image captured by the camera 10. The recognizer 130 is not limited to recognizing road partition lines and may recognize a running lane by recognizing running lane boundaries (road boundaries) including a road partition line, a road shoulder, curbstones, a median strip, a guardrail, and the like. In the recognition, the position of the subject vehicle M acquired from the navigation device 50 or a result of the process executed by an INS may be additionally taken into account. In addition, the recognizer 130 may recognize a temporary stop line, an obstacle, a red light, a tollgate, and other road events.

When a running lane is recognized, the recognizer 130 recognizes a position and a posture of the subject vehicle M with respect to the running lane. The recognizer 130, for example, may recognize a deviation of a reference point on the subject vehicle M from the center of the lane and an angle of the advancement direction of the subject vehicle M formed with respect to a line along the center of the lane as a relative position and a posture of the subject vehicle M with respect to the running lane. Instead of this, the recognizer 130 may recognize a position of a reference point on the subject vehicle M with respect to a one side end part (a road partition line or a road boundary) of the running lane or the like as a relative position of the subject vehicle M with respect to the running lane.

The action plan generator 140 basically runs on a recommended lane determined by the recommended lane determiner 61 and generates a target locus along which the subject vehicle M will run automatically (independently of responding to a driver's operation) in the future such that a surroundings status of the subject vehicle M can be responded to. The target locus, for example, includes a speed element. For example, the target locus is represented by sequentially aligning places (locus points) at which the subject vehicle M is to arrive. A locus point is a place at which the subject vehicle M will arrive at respective predetermined running distances (for example, about every several [m]) as distances along the road, and separately, a target speed and a target acceleration for each of predetermined sampling times (for example, a fraction of a [sec]) are generated as a part of the target locus. A locus point may be a position at which the subject vehicle M will arrive at a sampling time for each of predetermined sampling times. In such a case, information of a target speed or a target acceleration is represented using intervals between the locus points.

The action plan generator 140 may set an event of automated driving when a target locus is generated. As events of automated driving, there are a constant-speed running event, a low-speed following running event, a lane change event, a branching event, a merging event, an overtaking event, and the like. The action plan generator 140 generates a target locus according to an operating event.

The second controller 160 performs control of the running driving force output device 200, the brake device 210, and the steering device 220 such that the subject vehicle M passes along a target locus generated by the action plan generator 140 at a scheduled time.

The second controller 160, for example, includes an acquirer 162, a speed controller 164, and a steering controller 166. The acquirer 162 acquires information of a target locus (a locus point) generated by the action plan generator 140 and stores the target locus information in a memory (not shown). The speed controller 164 controls the running driving force output device 200 or the brake device 210 on the basis of a speed element accompanying the target locus stored in the memory. The steering controller 166 controls the steering device 220 in accordance with a degree of curvature of the target locus stored in the memory. The processes of the speed controller 164 and the steering controller 166, for example, are implemented by a combination of feed forward control and feedback control. For example, the steering controller 166 may execute feed forward control according to the curvature of a road in front of the subject vehicle M and feedback control based on a deviation from the target locus in combination.

The running driving force output device 200 outputs a running driving force (torque) used for a vehicle to run to driving wheels. The running driving force output device 200, for example, includes a combination of an internal combustion engine, an electric motor, a transmission, and the like and an ECU controlling these components. The ECU controls the components described above in accordance with information input from the second controller 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second controller 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the second controller 160.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the second controller 160 or information input from the driving operator 80.

[Process (1) Based on Advancement Direction of Traffic Participant]

Figure 3:
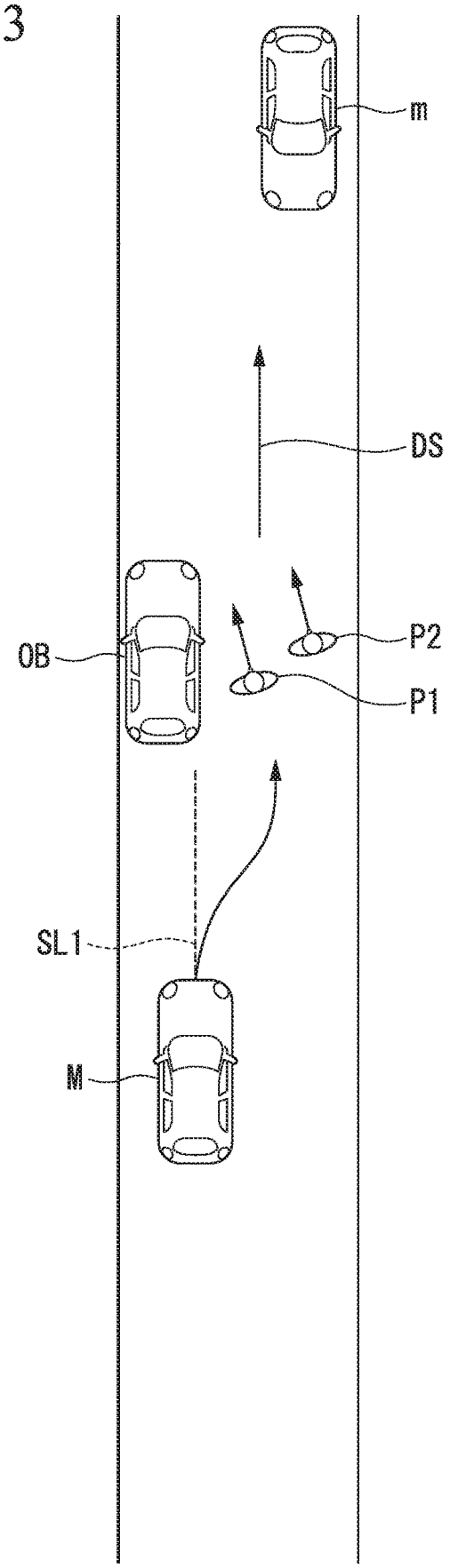
FIG. 3 is a diagram showing a process (1) based on an advancement direction of traffic participants.

FIG. 3 is a diagram showing a process (1) based on an advancement direction of traffic participants. The automated driving control device 100 converts positions of a subject vehicle M and objects on an image plane into positions on an actual plane by referring to a predetermined conversion table and performs the following process. In this case, the automated driving control device 100 may convert the positions of the subject vehicle M and the objects into positions at which the subject vehicle M is seen from the sky as shown in FIGS. 3 to 11, 13, and 14 and may perform the process.

In a case in which an obstacle OB (a target obstacle) present in the advancement direction of the subject vehicle M, an oncoming vehicle m advancing in a direction opposing the subject vehicle M, and traffic participants (a pedestrian P1 and a pedestrian P2) present near the obstacle OB are recognized by the recognizer 130, and the subject vehicle M is caused to avoid the object vehicle OB, the action plan generator 140 controls the subject vehicle M on the basis of advancement directions of the traffic participants. The obstacle OB (a target obstacle), for example, is an obstacle present closest to the subject vehicle M in the advancement direction of the subject vehicle M. "Near the obstacle OB" is, for example, is within a predetermined distance from the obstacle OB.

The action plan generator 140, for example, controls the subject vehicle M with more importance placed on advancement directions of traffic participants. Here, "placing more importance" represents performing a determination using the advancement directions of traffic participants as a reference first, performing only a determination using the advancement directions of traffic participants as a reference, assigning a larger weight to the advancement directions of traffic participants than weights for the other factors in performing processes in parallel with each other, or the like. For example, first, the action plan generator 140 determines a first policy relating to a behavior of the subject vehicle M on the basis of advancement directions of traffic participants and next, corrects the first policy on the basis of factors other than the advancement directions of the traffic participants. For example, although a first policy in which the subject vehicle M passes by an obstacle OB by following the pedestrian P1 and the pedestrian P2 is set, in a case in which an oncoming vehicle m advances up to the front of the obstacle OB, the first policy is corrected. The corrected first policy, for example, is a policy in which, after the pedestrian P1 and the pedestrian P2 pass by the obstacle OB, and the oncoming vehicle m passes by the obstacle OB, the subject vehicle M passes by the obstacle OB.

The shown example represents a view in which the subject vehicle M runs on a specific road. Here, the specific road, for example, is a road on which the subject vehicle M can pass by an oncoming vehicle (or a bicycle or any other moving object) on the way with a predetermined marginal width. More specifically, the specific road is a road having a road width (predetermined width) on which, in the case of passing by an obstacle OB, one of the subject vehicle M and an oncoming vehicle m needs to wait in front of the obstacle OB until the other vehicle passes by the obstacle OB. In other words, in a case in which the subject vehicle M passes along a road of which the road width is less than a predetermined width, the action plan generator 140 controls the vehicle on the basis of advancement directions of traffic participants.

An "obstacle" is an object inhibiting running of the subject vehicle M or an object having an influence on a target locus of the subject target M in a case in which the subject vehicle M runs on the basis of a first reference line SL1 (first target locus) deviating to one side (for example, the left side) of the road. More specifically, the "obstacle," as shown in the drawing, may be a vehicle during stop or may be an object (for example, a bicycle, an electric post, a sign board, or the like that is placed) that needs to be avoided by a vehicle for running or a state of a road (unevenness of the road or a state under construction) needs to be avoided by the vehicle for running.

An "oncoming vehicle" is a vehicle having an influence on the subject vehicle M in a case in which the subject vehicle M runs near the obstacle OB. The "oncoming vehicle," for example, is a vehicle present on the advancement direction side of the subject vehicle M with respect to the obstacle OB and is a vehicle present within a predetermined distance from the obstacle OB. The predetermined distance is a distance set on the basis of a speed of the oncoming vehicle m and, for example, is set to be longer as the speed of the oncoming vehicle m increases.

The "first reference line SL1 (or a "second reference line SL2 (a second target locus)" to be described later) is a target locus, which is generated by the action plan generator 140, when the subject vehicle M runs. The subject vehicle M is controlled such that a reference position of the subject vehicle M (for example, the center of the subject vehicle M in the horizontal direction) runs on a target locus.

The "first reference line SL1," for example, is set to the left side from the center of the width of the road. The first reference line SL1, for example, is a target locus along which the subject vehicle M runs when it is assumed that the subject vehicle M and an oncoming vehicle m pass by each other in a state in which an obstacle OB is not present on a specific road.

"Traffic participants" are pedestrians, bicycles, and objects (for example, moving bodies) present on a road in the vicinity of the subject vehicle M or the obstacle OB. Vehicles may be included in the traffic participants. In the following description, traffic participants will be described as pedestrians. A specific example of traffic participants present near the obstacle OB will be described later (see FIG. 9).

"Advancement directions of traffic participants" are directions in which the pedestrian P1 and the pedestrian P2 are moving. The recognizer 130 derives a direction in which each pedestrian is moving by referring to a position of the pedestrian for every unit time. Then, the recognizer 130 recognizes the direction in which the pedestrian is moving as an advancement direction of the pedestrian.

As shown in the drawing, in a case in which advancement directions of all the traffic participants among the traffic participants (the pedestrian P1 and the pedestrian P2) present near the obstacle OB coincide with a reference direction according to the advancement direction of the subject vehicle M (details will be described later; DS in the drawing), the action plan generator 140 performs control of the vehicle to avoid the obstacle OB. Then, after the subject vehicle M passes by the obstacle OB by following the pedestrian P1 or the P2 at the time of avoiding the obstacle OB, the action plan generator 140 performs control of the subject vehicle M on the basis of the first reference line.

Figure 4:
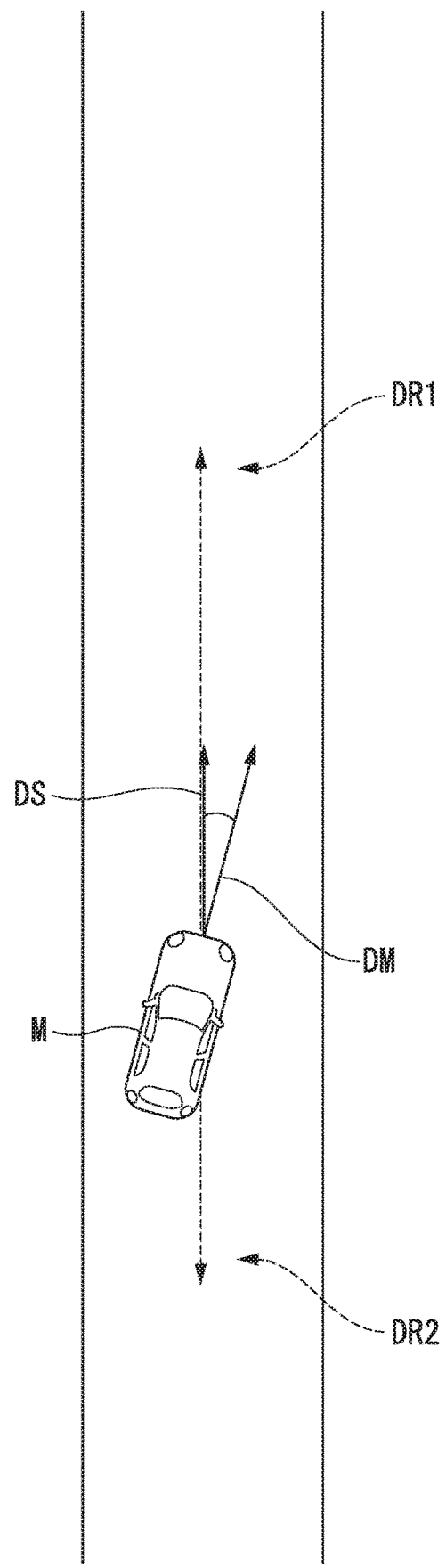
FIG. 4 is a diagram showing a reference direction according to an advancement direction of a subject vehicle.

FIG. 4 is a diagram showing a reference direction according to the advancement direction of the subject vehicle M. In the example shown in FIG. 4, the obstacle OB, the pedestrian P1, the pedestrian P2, and the oncoming vehicle m are not shown. "The reference direction according to the advancement direction of the subject vehicle M" is a direction having a relationship of being at an acute angle to the advancement direction of the subject vehicle M (DS in the drawing) among extending directions of the road.

First, the recognizer 130 derives an extending direction DR (DR1 or DR2) of the road in which the road extends and the advancement direction DM of the subject vehicle M. The extending direction DR of a road is a direction in which the road extends and, for example, is a direction in which a line acquired by aligning positions of the center of the width of the road (or the center of a road partition line or the like) extends. The recognizer 130 derives a direction (DR1) having a relationship of being at an acute angle to the advancement direction DM of the subject vehicle M out of two directions along the extending direction DR of the road as a reference direction DS. The recognizer 130 may set the advancement direction of the subject vehicle M as "a reference direction according to the advancement direction of the subject vehicle M."

Figure 5:
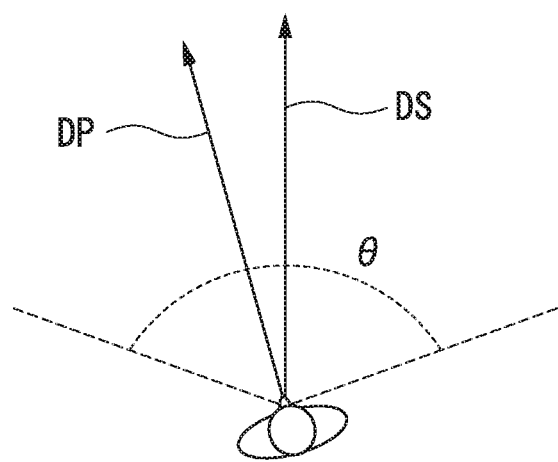
FIG. 5 is a diagram showing a process in which coincidence between a reference direction and an advancement direction of a pedestrian is determined.

FIG. 5 is a diagram showing a process in which coincidence between a reference direction DS and an advancement direction DP of a pedestrian is determined. For example, in a case in which the advancement direction DP of the pedestrian enters the inside of the range of an angle θ having the reference direction DS as the center, the recognizer 130 determines that the advancement direction of the pedestrian and the reference direction (the reference direction according to the advancement direction of the subject vehicle M) coincide with each other. In a case in which the advancement directions of all the traffic participants and the reference direction according to the advancement direction of the subject vehicle M coincide with each other, the action plan generator 140 performs control of the subject vehicle M to avoid the obstacle OB. More specifically, the action plan generator 140 passes by the obstacle OB by following the pedestrian P1 and the pedestrian P2 at the time of avoiding the obstacle OB.

As described above, by controlling the subject vehicle M on the basis of the advancement direction of the traffic participant, the action plan generator 140 can appropriately control the vehicle in accordance with traffic conditions. For example, in a case in which a pedestrian is present near the obstacle OB, the subject vehicle M can be appropriately controlled. In addition, also when an oncoming vehicle m is present, the vehicle control M can be controlled such that the pedestrian and the oncoming vehicle m can smoothly pass by avoiding the obstacle OB.

[Process (2) Based on Advancement Direction of Traffic Participant]

Figure 6:
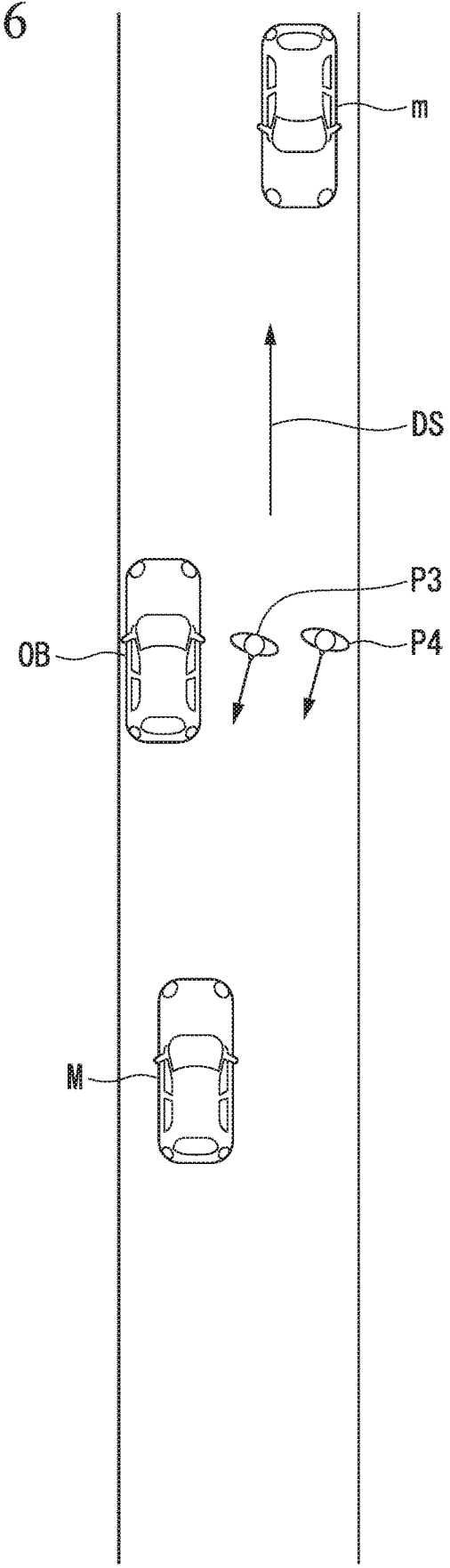
FIG. 6 is a diagram showing a process (2-1) based on an advancement direction of traffic participants.

FIG. 6 is a diagram showing a process (2-1) based on an advancement direction of traffic participants. FIG. 6 is a view in which it is determined that advancement directions of all the pedestrians P3 and P4 and a reference direction do not coincide with each other. As shown in the drawing, in a case in which the advancement directions of the pedestrian P3 and the pedestrian P4 do not coincide with a reference direction according to the advancement direction of the subject vehicle M, the action plan generator 140 performs control of the subject vehicle M such that it stops in front of the obstacle OB. Here, the "front," for example, is a position at which the subject vehicle M can avoid the obstacle OB without accompanying a moving back operation after temporary stop in a case in which the subject vehicle M passes by avoiding the obstacle OB after the temporary stop. This position, for example, is a position at which the subject vehicle can avoid the obstacle OB without accompanying a moving back operation, a position acquired by adding a marginal distance to a position at which a distance between the obstacle OB and the subject vehicle M is the shortest, and a position several meters to several tens of meters in front of the obstacle OB. The position in front described above is a position at which it is assumed that a driver stops the subject vehicle in front of the obstacle OB through manual driving and may be a position that is acquired experimentally or statistically in advance.

Then, after the pedestrian P3 and the pedestrian P4 pass by the obstacle OB, in a case in which the oncoming vehicle m advances to pass by the obstacle OB, the subject vehicle M passes by the obstacle OB after the oncoming vehicle m passes by the obstacle OB.

Figure 7:
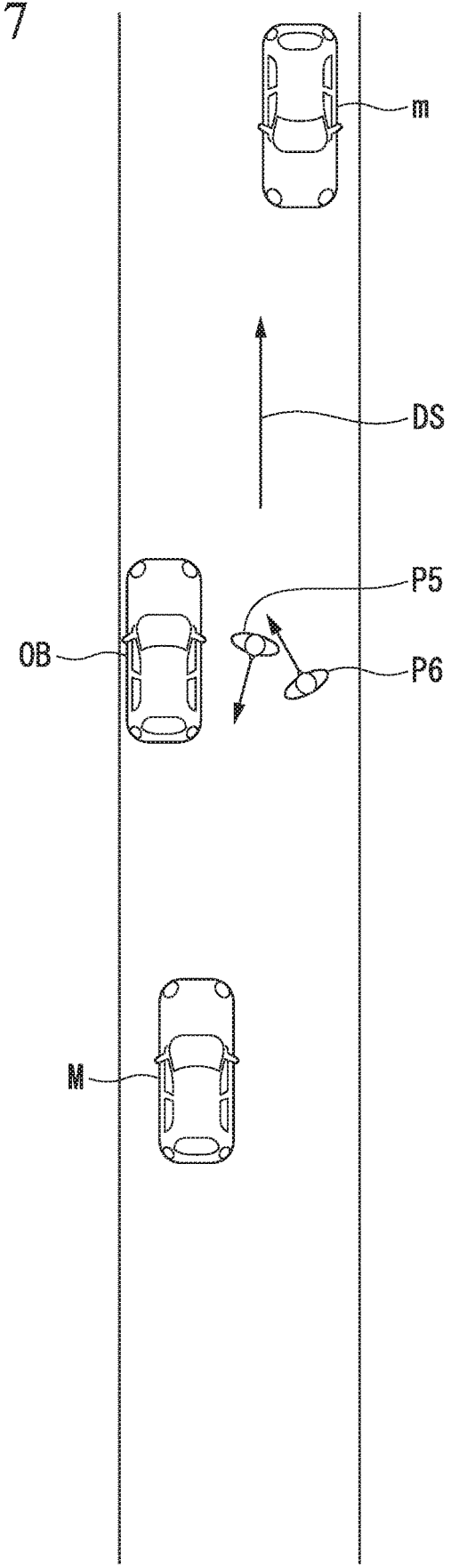
FIG. 7 is a diagram showing a process (2-2) based on advancement directions of traffic participants.

FIG. 7 is a diagram showing a process (2-2) based on advancement directions of traffic participants. FIG. 7 is a view in which an advancement direction of one pedestrian P5 and a reference direction are determined not to coincide with each other. As shown in the drawing, in a case in which the advancement direction of the pedestrian P5 does not coincide with a reference direction according to the advancement direction of the subject vehicle M, the action plan generator 140 performs control of the subject vehicle M such that it stops in front of the obstacle OB. Then, after the pedestrian P5 and the pedestrian P6 pass by the obstacle OB, in a case in which the oncoming vehicle m advances to pass by the obstacle OB, the subject vehicle M passes by the obstacle OB after the oncoming vehicle m passes by the obstacle OB.

Figure 8:
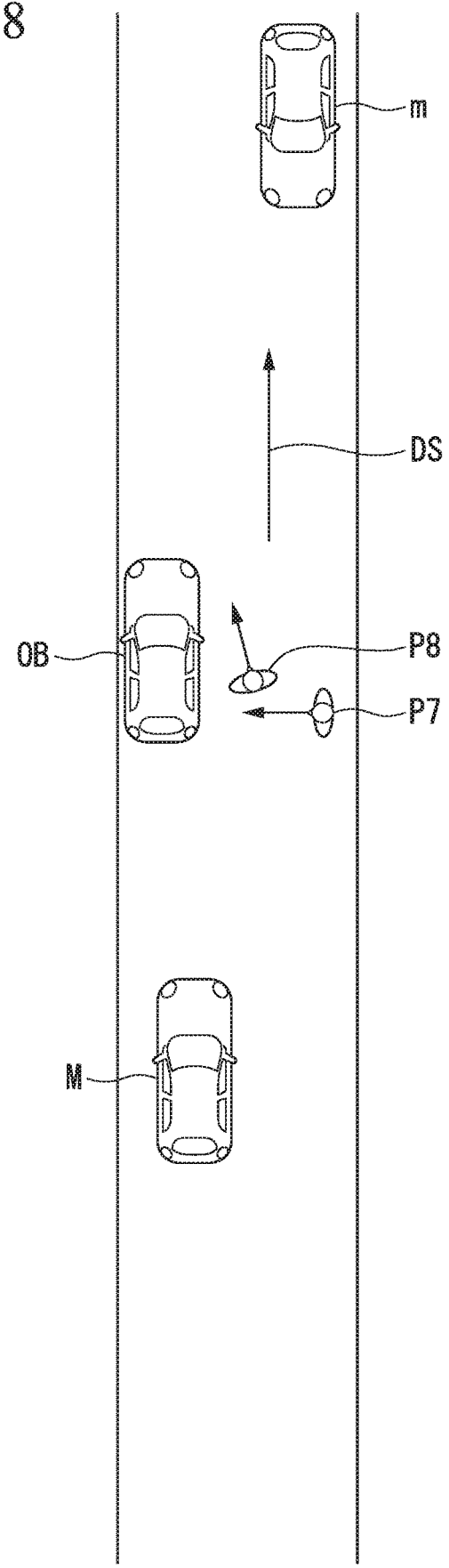
FIG. 8 is a diagram showing a process (2-3) based on advancement directions of traffic participants.

FIG. 8 is a diagram showing a process (2-3) based on advancement directions of traffic participants. FIG. 8 is a view in which a pedestrian P8 advances in a reference direction DS, and a pedestrian P7 crosses a road. In this case, it is assumed to be determined that the advancement direction of the pedestrian P8 and the reference direction DS coincide with each other, and the advancement direction of the pedestrian P7 and the reference direction do not coincide with each other. As shown in the drawing, in a case in which the advancement direction of the pedestrian P7 does not coincide with the reference direction according to the advancement direction of the subject vehicle M, the action plan generator 140 performs control of the subject vehicle M such that it stops in front of the obstacle OB. Then, after the pedestrian P7 crosses and passes by the obstacle OB, and the pedestrian P8 passes by the obstacle OB, in a case in which the oncoming vehicle m advances to pass by the obstacle OB, the subject vehicle M passes the obstacle OB after the oncoming vehicle m passes by the obstacle OB.

As described above, in a case in which advancement directions of one or more pedestrians among traffic participants present near the obstacle OB do not coincide with the reference direction according to the advancement direction of the subject vehicle M, the action plan generator 140 performs control of the vehicle such that it stops in front of the obstacle OB. In this way, in a case in which there is a pedestrian coming toward the subject vehicle M side, the subject vehicle M stops in front of the obstacle OB, and accordingly, it can be inhibited to interrupt the flow of the traffic. As a result, the vehicle can be appropriately controlled in accordance with the traffic condition.

[Traffic Participant (1) Present Near Obstacle]

Figure 9:
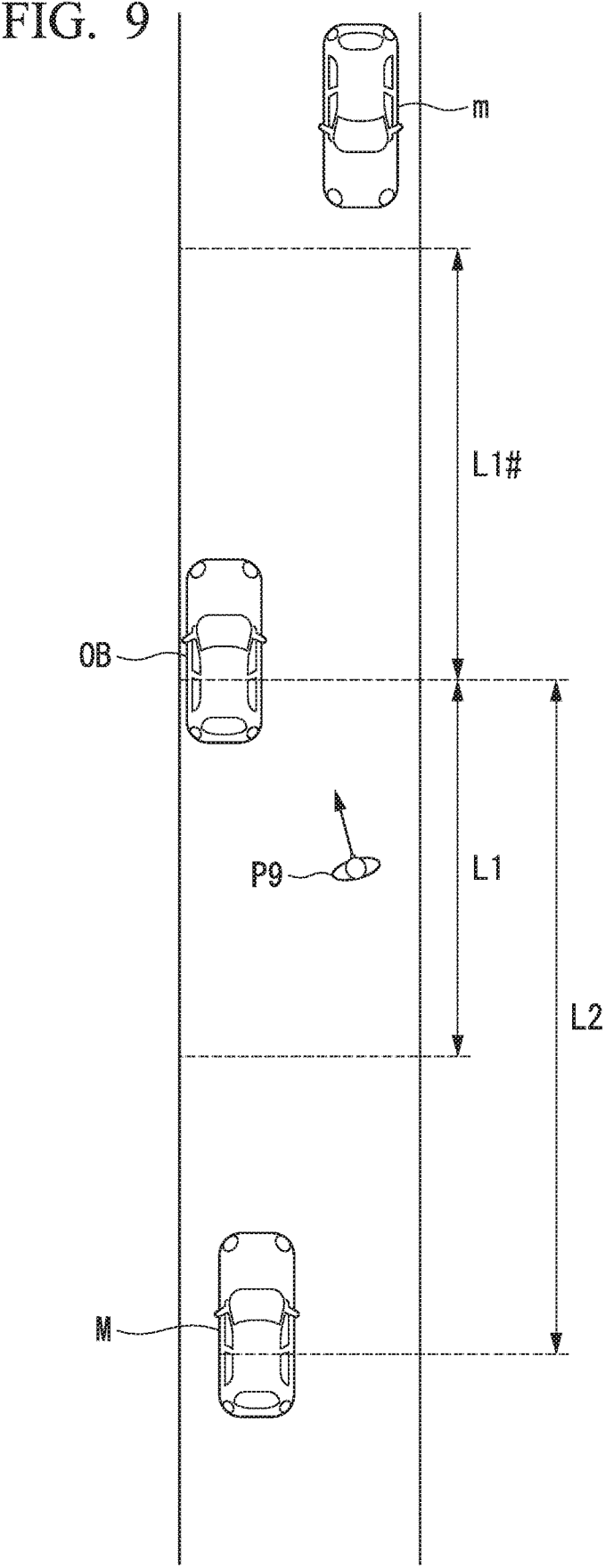
FIG. 9 is a diagram showing a pedestrian (1) present near an obstacle.

FIG. 9 is a diagram showing a pedestrian (1) present near an obstacle OB. "Being present near the obstacle OB" represents being present within a first predetermined distance L1 or a first predetermined distance L1# from the obstacle OB. More specifically, in a case in which a distance between the subject vehicle M and the obstacle OB is within a second predetermined distance L2, a pedestrian present near the obstacle OB is a pedestrian (for example, a pedestrian P9) present within the first predetermined distance L1 or the first predetermined distance L1# from the obstacle OB. The second predetermined distance L2 is a distance longer than the first predetermined distance L1 or the first predetermined distance L1#.

The first predetermined distance L1 is a distance defining a range of a side in front (the subject vehicle M side) from the obstacle OB. The first predetermined distance L1# is a distance defining a range of a side in rear (the advancement direction side of the subject vehicle M) from the obstacle OB. The first predetermined distance L1 and the first predetermined distance L1# may be the same or be different from each other. For example, the first predetermined distance L1# may be set as a distance shorter than the first predetermined distance L1.

[Traffic Participant (2) Present Near Obstacle]

Figure 10:
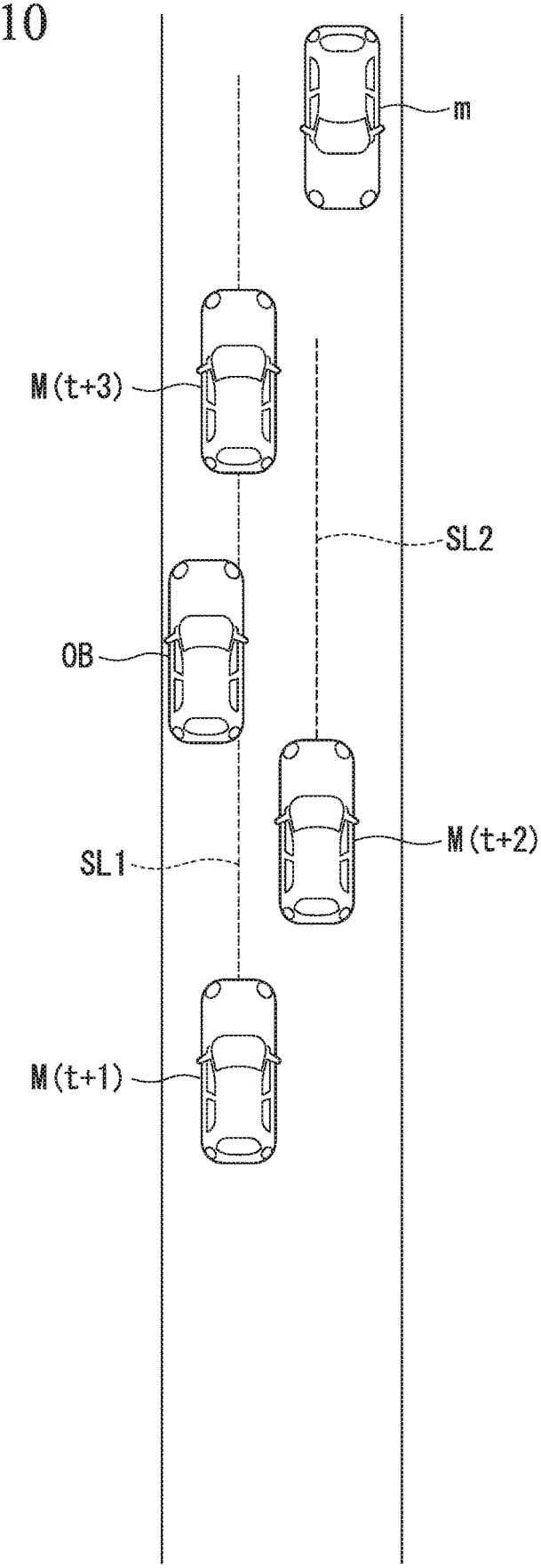
FIG. 10 is a diagram showing a pedestrian (2) present near an obstacle.

FIG. 10 is a diagram showing a pedestrian (2) present near an obstacle OB. In the example shown in FIG. 10, pedestrians are not shown. Traffic participants are traffic participants present near an obstacle OB during a predetermined time. Here, the predetermined time is a time required for completing a behavior in a case in which the behavior of returning from a second reference line SL2 to a first reference line SL1 is predicted after the subject vehicle M running along the first reference line deviating to one side of a road runs along the second reference line SL2, then the subject vehicle M avoids an obstacle OB. Here, "the second reference line SL2" is a line disposed toward a side of the center of the road from the first reference line SL1 for avoiding the obstacle OB. The "second reference line SL2" is a target locus in a case in which the subject vehicle M runs without brought into contact with the obstacle OB.

It is assumed that the action plan generator 140, for example, causes the subject vehicle M to run along the first reference line SL1 at a time t+1 on the basis of surrounding traffic conditions (for example, a position, a speed, and the like of the oncoming vehicle m) and causes the subject vehicle M to run on the basis of the second reference line SL2 for avoiding the obstacle OB at a time t+2. In addition, it is assumed that the action plan generator 140 causes the subject vehicle M to run on the basis of the first reference line SL1 instead of the second reference line at a time t+3 after passing by the obstacle OB.

In this way, the action plan generator 140 generates a plan when the subject vehicle M passes by the obstacle OB and derives a required time (the time t+1 to t+3) until the subject vehicle M passes by the obstacle OB.

The recognizer 130 determines whether or not a pedestrian is present within a predetermined range having the obstacle OB as its center in the required time on the basis of positions of pedestrians in the vicinity of the obstacle OB and walking speeds derived on the basis of position histories of the pedestrians. For example, as shown in FIG. 11, in a case in which it is determined that a pedestrian is present within the range of the first predetermined distance L1 or the first predetermined distance L1# from the obstacle OB in the required time, the action plan generator 140, for example, performs control of the subject vehicle M such that it stops in front of the obstacle OB.

Figure 11:
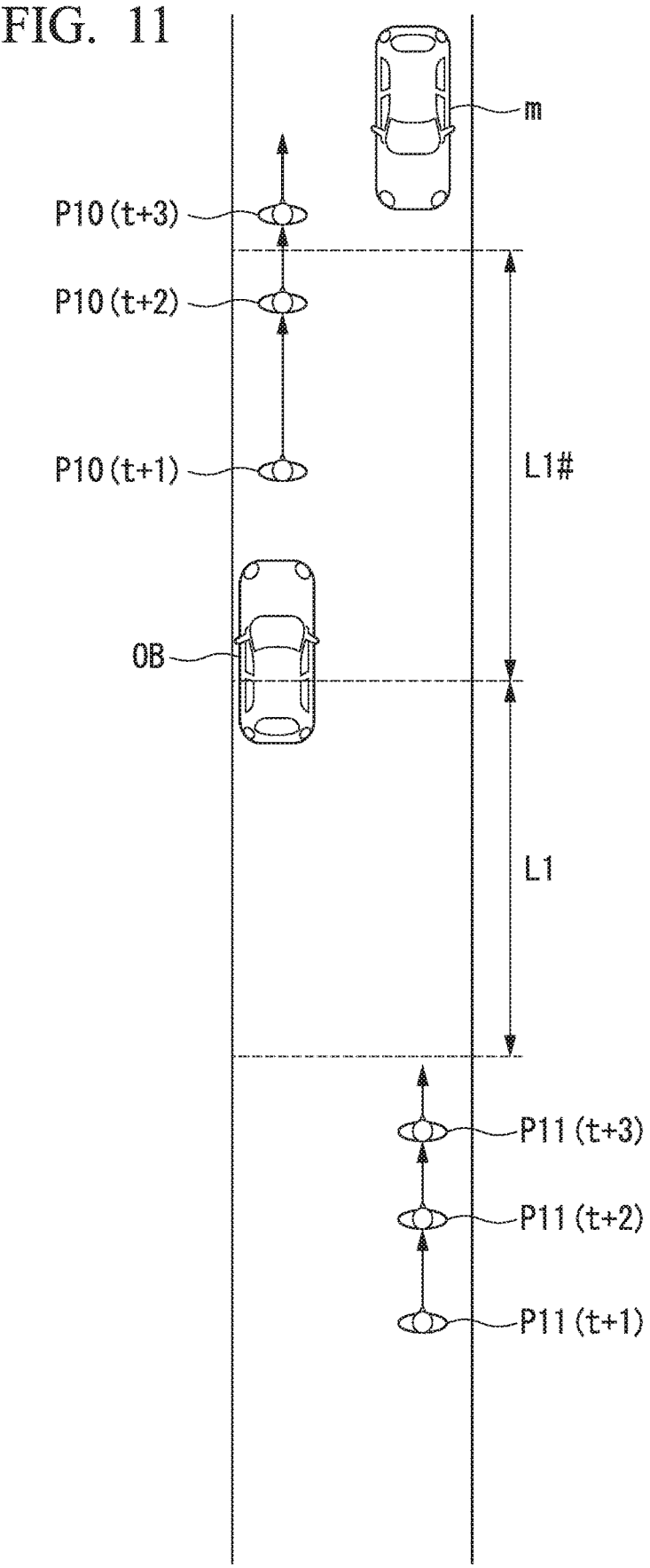
FIG. 11 is a diagram showing positions of a pedestrian in a required time.

FIG. 11 is a diagram showing positions of a pedestrian in a required time. A pedestrian P10 is present within the range of the first predetermined distance L1# from the obstacle OB between a time t+1 and a time t+2 (during the required time) and thus is a pedestrian present near the obstacle OB. A pedestrian P11 is not present within the range of the first predetermined distance L1 and the first predetermined distance L1# from the obstacle OB between a time t+1 and a time t+3 (during the required time) and thus is a pedestrian not present near the obstacle OB.

As described above, the automated driving control device 100 can appropriately take a pedestrian having an influence when the subject vehicle M runs into account. As a result, the automated driving control device 100 can appropriately perform control of the vehicle in accordance with traffic conditions while reducing the processing load.

[Flowchart]

Figure 12:
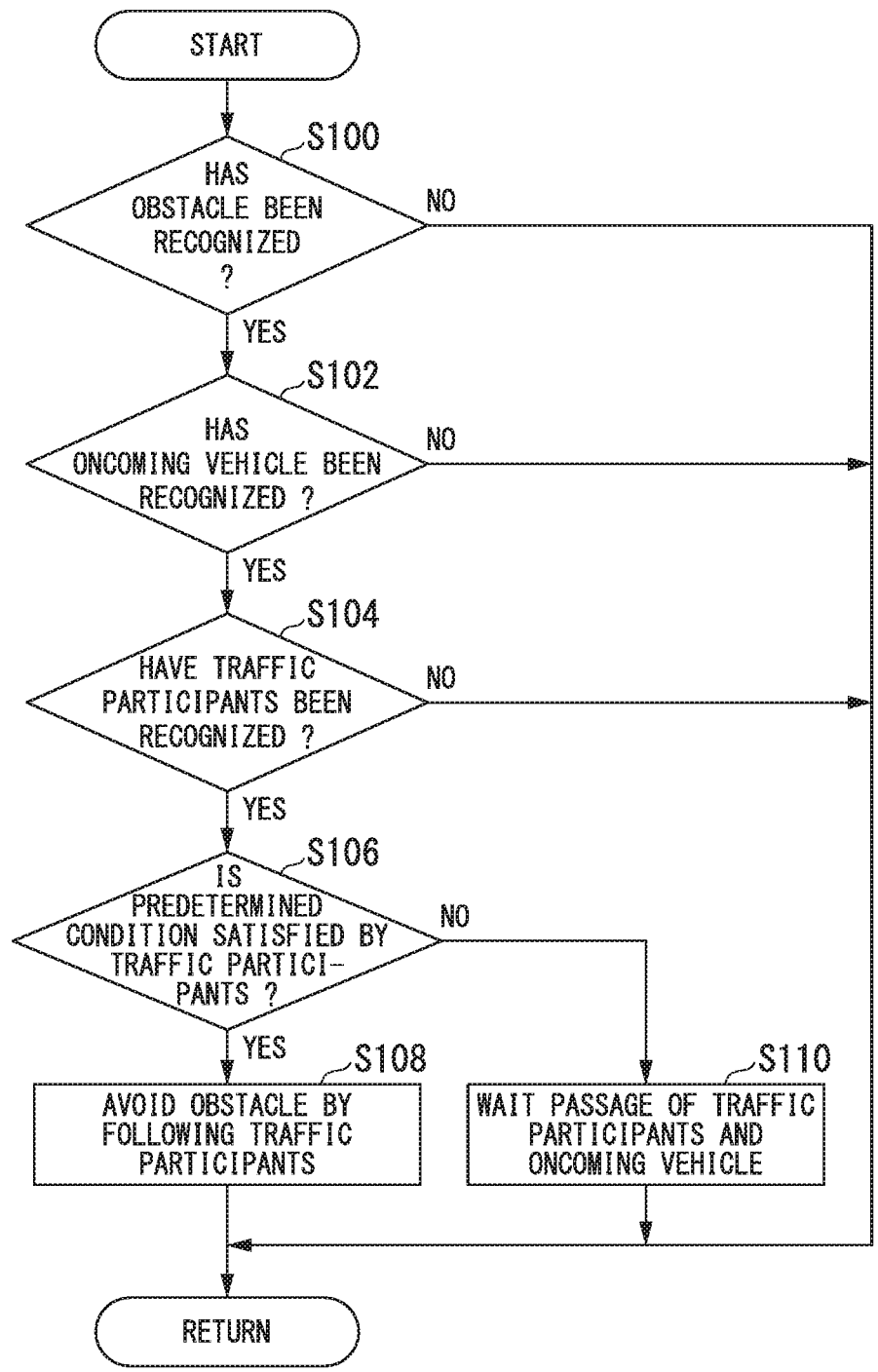
FIG. 12 is a flowchart showing one example of the flow of a process executed by an automated driving control device.

FIG. 12 is a flowchart showing one example of the flow of a process executed by the automated driving control device 100. For example, the process of this flowchart is started in a case in which a distance between the subject vehicle M and an obstacle OB becomes within a predetermined distance (a third predetermined distance). The third predetermined distance is greater than the first predetermined distance L1, the first predetermined distance L1#, and the second predetermined distance L2.

First, the action plan generator 140 determines whether or not an obstacle present in the advancement direction of the subject vehicle M has been recognized by the recognizer 130 (Step S100). In a case in which an obstacle has been recognized, the action plan generator 140 determines whether or not an oncoming vehicle has been recognized by the recognizer 130 (Step S102). In a case in which the oncoming vehicle has been recognized, the action plan generator 140 determines whether or not a traffic participant present near the obstacle has been recognized by the recognizer 130 (Step S104). In a case in which an obstacle has not been recognized in Step S100, in a case in which an oncoming vehicle has not been recognized in Step S102, or in a case in which a traffic participant has not been recognized in Step S104, the process of one routine of this flowchart ends.

In a case in which a traffic participant has been recognized, the action plan generator 140 determines whether or not the traffic participant satisfies a predetermined condition (Step S106). Here, the "predetermined condition" is coincidence of advancement directions of all the pedestrians present near the obstacle OB with a reference direction according to an advancement direction of the subject vehicle.

In a case in which the predetermined condition has been satisfied, the action plan generator 140 performs control of the subject vehicle M to avoid the obstacle by following the traffic participants (Step S108). On the other hand, in a case in which the predetermined condition has not been satisfied, the action plan generator 140 waits for passage of the traffic participants and the oncoming vehicle and performs control such that the subject vehicle M passes by the obstacle after the traffic participants and the oncoming vehicle pass by the obstacle (Step S110). In this way, the process of one routine of this flowchart ends.

As described above, in a case in which an obstacle, an oncoming vehicle, and a traffic participant present near the obstacle are recognized, and the subject vehicle M is caused to avoid the obstacle, the action plan generator 140 cam appropriately control the vehicle in accordance with traffic conditions by controlling the subject vehicle M on the basis of the advancement directions of pedestrians.

Another Example 1

Figure 13:
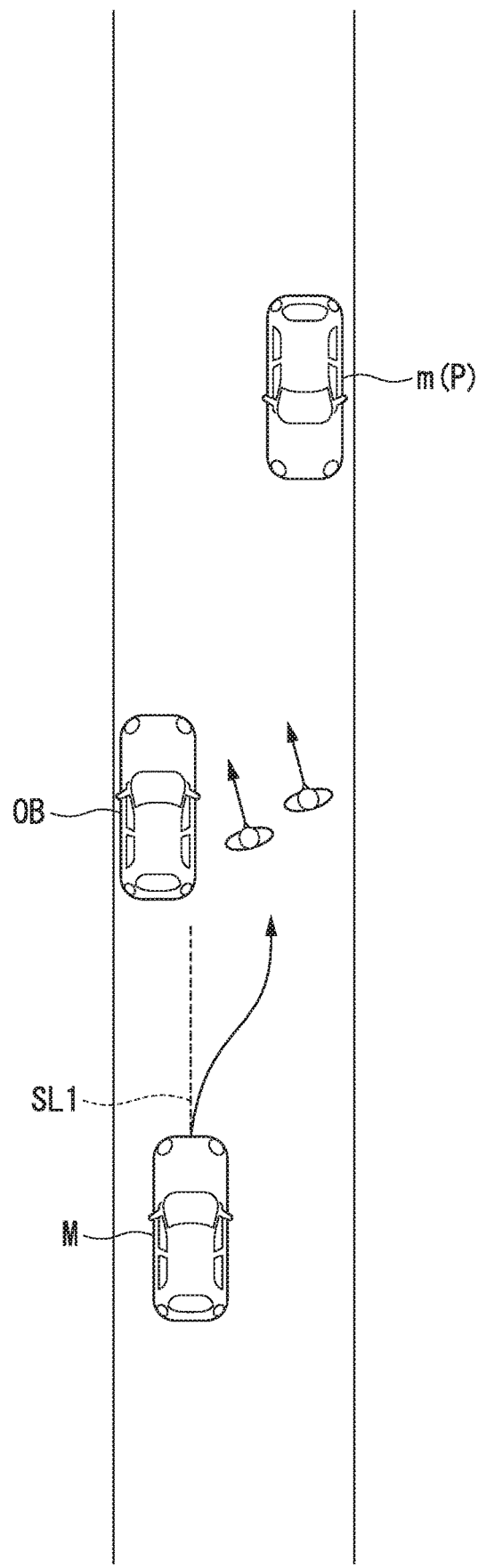
FIG. 13 is a diagram showing another example 1.

FIG. 13 is a diagram showing another example 1. In the other examples (for example, FIG. 3 and the like), although the oncoming vehicle m has been described as being present, in this example, a stopped vehicle m(P) is assumed to be present instead of the oncoming vehicle m. The stopped vehicle m(P) is a vehicle that is stopped on the side of the advancement direction of the subject vehicle M and on the right side with respect to the obstacle OB when seen from the subject vehicle M. The stopped vehicle m(P) is another example of an "oncoming vehicle." Also in such a view, the action plan generator 140 controls the subject vehicle M on the basis of the advancement directions of the traffic participants and thus can appropriately control the vehicle in accordance with the traffic conditions.

Another Example 2

Figure 14:
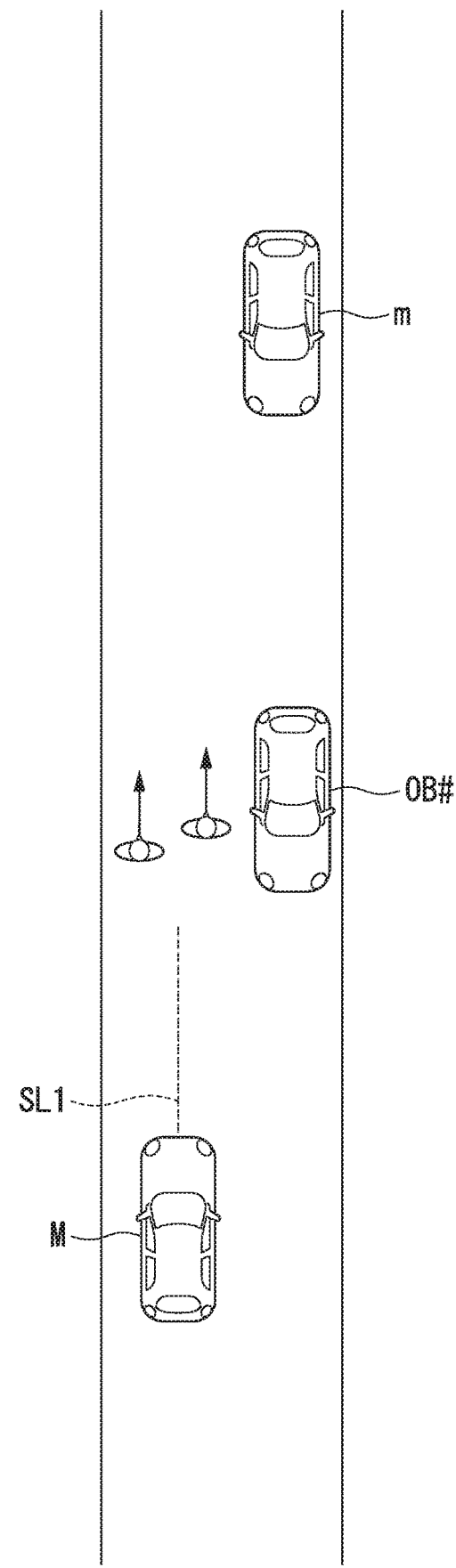
FIG. 14 is a diagram showing another example 2.

FIG. 14 is a diagram showing another example 2. Although an obstacle OB has been described as being present on the left side of the road in other examples (for example, FIG. 3 and the like), in this example, as obstacle OB# is assumed to be present on the right side of a road. Also in such a view, the action plan generator 140 controls the subject vehicle M on the basis of advancement directions of traffic participants.

In this view, in a case in which advancement directions of one or more pedestrians do not coincide with a reference direction according to the advancement direction of the subject vehicle M, the vehicle is controlled to stop in front of the obstacle OB#, and, after all the pedestrians pass by the obstacle OB#, in a case in which an oncoming vehicle or the like showing an intention to pass by the obstacle OB# is not present, the subject vehicle M passes by the obstacle OB#. An oncoming vehicle showing an intention to pass by the obstacle OB# is a vehicle approaching the obstacle OB, a vehicle moving along a locus passing by the obstacle OB#, or the like.

As described above, the action plan generator 140 controls the subject vehicle M on the basis of advancement directions of traffic participants regardless of a position at which an obstacle OB is present and thus can appropriately control the vehicle in accordance with traffic conditions.

In the examples described above, although the process in a view in which an oncoming vehicle is present has been described, also in a view in which no oncoming vehicle is present, the subject vehicle M may be controlled on the basis of the advancement directions of traffic participants.

According to the embodiment described above, the recognizer 130 recognizing a surroundings status of a subject vehicle M and the action plan generator controlling at least the steering of the subject vehicle M on the basis of the surroundings status recognized by the recognizer 130 are included, and, in a case in which an obstacle present in the advancement direction of the subject vehicle M and traffic participants present near the obstacle are recognized by the recognizer 130, and the subject vehicle M is caused to avoid the obstacle, the action plan generator 140 controls the subject vehicle M on the basis of the advancement directions of the traffic participants, whereby the vehicle can be appropriately controlled in accordance with the traffic conditions.

[Hardware Configuration]

Figure 15:
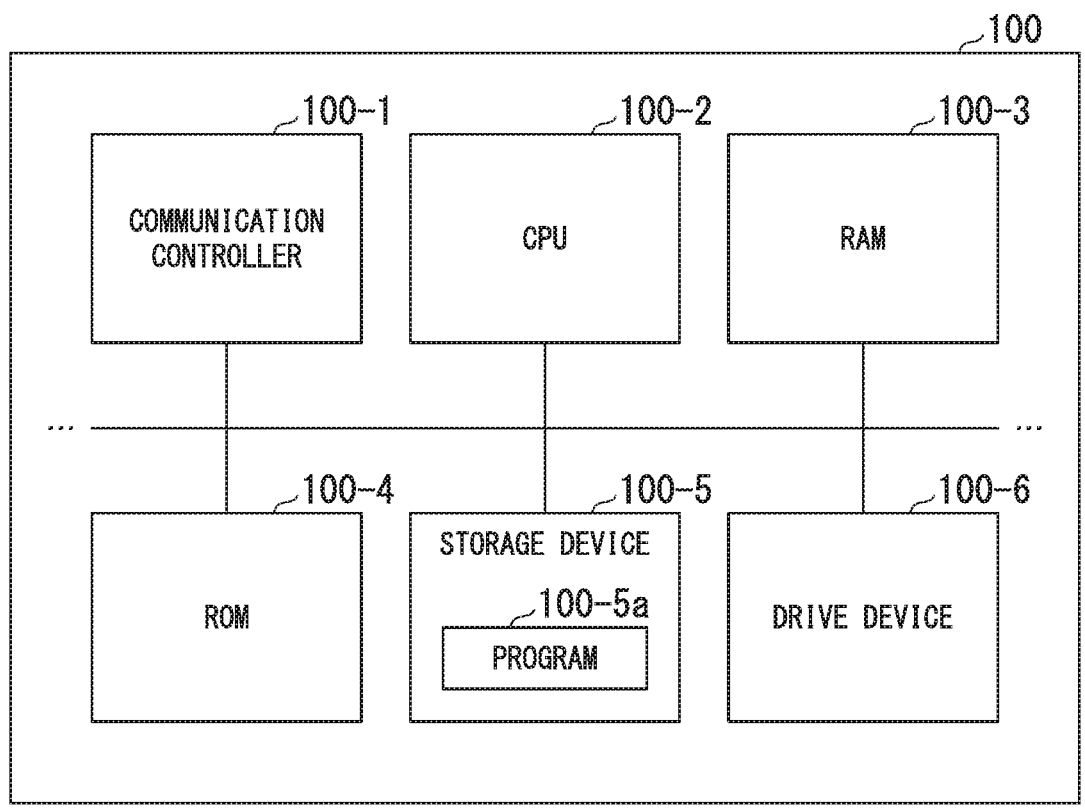
FIG. 15 is a diagram showing one example of the hardware configuration of an automated driving control device according to an embodiment.

FIG. 15 is a diagram showing one example of the hardware configuration of an automated driving control device 100 according to an embodiment. As shown in the drawing, the automated driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or an hard disk drive (HDD), a drive device 100-6, and the like are interconnected through an internal bus or a dedicated communication line. The communication controller 100-1 communicates with constituent elements other than the automated driving control device 100. A program 100-5a executed by the CPU 100-2 is stored in the storage device 100-5. This program is expanded into the RAM 100-3 by a direct memory access (DMA) controller (not shown in the drawing) or the like and is executed by the CPU 100-2. In this way, some or all of the recognizer 130, the action plan generator 140, and the second controller 160 are realized.

The embodiment described above can be represented as below.

A vehicle control device including a storage device storing a program and a hardware processor and configured such that the hardware processor, by executing the program stored in the storage device, recognizes a surroundings status of a vehicle and controls at least the steering of the vehicle on the basis of the recognized surroundings status, and, in a case in which an obstacle present in an advancement direction of the vehicle and traffic participants present near the obstacle are recognized through the recognition of the surroundings status, and the vehicle is caused to avoid the obstacle, controls the vehicle on the basis of the advancement directions of the traffic participants.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:
   a recognizer that is configured to recognize a surroundings status of a vehicle; and
   a driving controller that is configured to control at least steering of the vehicle on the basis of the surroundings status recognized by the recognizer,
   wherein, in a case in which a target obstacle present in an advancement direction of the vehicle, a first traffic participant present in a lateral direction of the target obstacle, and a second traffic participant present in the lateral direction of the target obstacle are recognized by the recognizer, and advancement directions of the first traffic participant and the second traffic participant coincide with a reference direction according to the advancement direction of the vehicle, the driving controller is configured to cause the vehicle to follow the first traffic participant and the second traffic participant to avoid the target obstacle,
   in a case in which the target obstacle, the first traffic participant, and the second traffic participant are recognized by the recognizer, and the advancement directions of the first traffic participant and the second traffic participant do not coincide with the reference direction, the driving controller is configured to cause the vehicle to avoid the target obstacle after the first traffic participant and the second traffic participant have passed through the target obstacle.

2. The vehicle control system according to claim 1, wherein, in a case in which the advancement directions of both the first traffic participant and the second traffic participant coincide with a reference direction according to the advancement direction of the vehicle, the driving controller is configured to perform control of the vehicle to avoid the target obstacle.

3. The vehicle control system according to claim 2, wherein the driving controller is configured to cause the first traffic participant and the second traffic participant to follow the vehicle when the vehicle is caused to avoid the target obstacle.

4. The vehicle control system according to claim 2, wherein the reference direction is a direction having a relationship of being at an acute angle to the advancement direction of the vehicle out of extending directions of a road.

5. The vehicle control system according to claim 1, wherein, in a case in which an advancement direction of either the first traffic participant or the second traffic participant does not coincide with a reference direction according to the advancement direction of the vehicle, the driving controller is configured to perform control of the vehicle such that it stops in front of the target obstacle.

6. The vehicle control system according to claim 1, wherein the first traffic participant and the second traffic participant are pedestrians.

7. The vehicle control system according to claim 1, wherein the first traffic participant or the second traffic participant is a traffic participant present within a first predetermined distance from the target obstacle.

8. The vehicle control system according to claim 1, wherein, in a case in which a distance between the vehicle and the target obstacle is within a second predetermined distance, the first traffic participant or the second traffic participant is a traffic participant present within a first predetermined distance, which is shorter than the second predetermined distance, from the target obstacle.

9. The vehicle control system according to claim 1, wherein, in a case in which a required time until the vehicle running along a first target locus deviating to one side of the road runs along a second target locus disposed on a side of a center of the road from the first target locus for avoiding the target obstacle and returns from the second target locus to the first target locus after the vehicle avoids the target obstacle is assumed, the first traffic participant or the second traffic participant is a traffic participant present within a predetermined range having the target obstacle as its center during the required time.

10. The vehicle control system according to claim 1, wherein the target obstacle is an object having an influence on a target locus of the vehicle in a case in which the vehicle runs.

11. The vehicle control system according to claim 1, wherein, in a case in which a distance to the target obstacle becomes within a third predetermined distance, the driving controller is configured to start a process of controlling the vehicle on the basis of the advancement directions of the first traffic participant and the second traffic participant.

12. The vehicle control system according to claim 1, wherein the driving controller is configured to control the vehicle on the basis of the advancement directions of the first traffic participant and the second traffic participant in the case of passing through a road of which a road width is less than a predetermined width.

13. The vehicle control system of claim 1, wherein, in a case in which the target obstacle, the first traffic participant, the second traffic participant, and an oncoming vehicle present in front of the target obstacle are recognized by the recognizer, and the advancement directions of the first traffic participant and the second traffic participant coincide with the reference direction, the driving controller is configured to cause the vehicle to follow the first traffic participant and the second traffic participant to avoid the target obstacle before the oncoming vehicle passes through the target obstacle,
in a case in which the target obstacle, the first traffic participant, the second traffic participant, and the oncoming vehicle are recognized by the recognizer, and the advancement directions of the first traffic participant and the second traffic participant do not coincide with the reference direction, the driving controller is configured to cause the vehicle to avoid the target obstacle after the first traffic participant, the second traffic participant, and the oncoming vehicle have passed through the target obstacle.

14. The vehicle control system of claim 13, wherein in a case in which the advancement direction of the first traffic participant coincides with the reference direction and the advancement direction of the second traffic participant does not coincide with the reference direction, the driving controller is configured to cause the vehicle to avoid the target obstacle after the first traffic participant, the second traffic participant, and the oncoming vehicle have passed through the target obstacle.

15. The vehicle control system of claim 1, wherein, in a case in which the vehicle passes through the target obstacle in a first road, and the advancement directions of the first traffic participant in the first road and the second traffic participant in the first road coincide with the reference direction, the driving controller is configured to cause the vehicle to follow the first traffic participant and the second traffic participant to avoid the target obstacle,
in a case in which the vehicle passes through the target obstacle in the first road, and the advancement directions of the first traffic participant in the first road and the second traffic participant in the first road do not coincide with the reference direction, the driving controller is configured to cause the vehicle to avoid the target obstacle after the first traffic participant, the second traffic participant, and an oncoming vehicle have passed through the target obstacle,
wherein the first road has a width in which the vehicle needs to wait without passing through the target obstacle until the oncoming vehicle passes through the target obstacle or in which the oncoming vehicle needs to wait without passing through the target obstacle until the vehicle passes through the target obstacle in a case where the vehicle passes through the first road, and
the first road has the width that enables to pass the vehicle and the oncoming vehicle each other with a predetermined marginal width in a case where the target obstacle is not in the first road.

16. A vehicle control method using a computer, the vehicle control method comprising:
recognizing a surroundings status of a vehicle;
controlling at least steering of the vehicle on the basis of the recognizing of the surroundings status; and
in a case in which a target obstacle present in an advancement direction of the vehicle, a first traffic participant present in a lateral direction of the target obstacle, and a second traffic participant present in the lateral direction of the target obstacle are recognized through the recognizing of the surroundings status, and advancement directions of the first traffic participant and the second traffic participant coincide with a reference direction according to the advancement direction of the vehicle, controlling the vehicle to avoid the target obstacle based on following the first traffic participant and the second traffic participant,
in a case in which the target obstacle, the first traffic participant, and the second traffic participant are recognized through the recognizing of the surroundings status, and the advancement directions of the first traffic participant and the second traffic participant do not coincide with the reference direction, causing the vehicle to avoid the target obstacle after the first traffic participant and the second traffic participant have passed through the target obstacle.

17. A non-transitory computer-readable storage medium that stores a computer program to be executed by a computer to perform at least:
- recognize a surroundings status of a vehicle;
- control at least steering of the vehicle on the basis of the recognized surroundings status; and
- in a case in which a target obstacle present in an advancement direction of the vehicle, a first traffic participant present in a lateral direction of the target obstacle, and a second traffic participant present in the lateral direction of the target obstacle are recognized through the recognition of the surroundings status, and advancement directions of the first traffic participant and the second traffic participant coincide with a reference direction according to the advancement direction of the vehicle, cause the vehicle to follow the first traffic participant and the second traffic participant to avoid the target obstacle,
- in a case in which the target obstacle, the first traffic participant, and the second traffic participant are recognized through the recognition of the surroundings status, and the advancement directions of the first traffic participant and the second traffic participant do not coincide with the reference direction, cause the vehicle to avoid the target obstacle after the first traffic participant and the second traffic participant have passed through the target obstacle.

* * * * *